Patented Dec. 23, 1930

1,786,361

UNITED STATES PATENT OFFICE

AUGUST PAHL, OF BERLIN-WILMERSDORF, GERMANY

PROCESS FOR THE PRODUCTION OF FILTER SIEVES AND SIEVES PRODUCED BY SUCH PROCESS

No Drawing. Application filed January 28, 1927, Serial No. 164,328, and in Germany May 20, 1925.

This invention relates to a new process for the production of filter-sieves or screens, such as those used for example for purifying liquids, gas or air, wherein charcoal, lime or the like is used as precipitating material, which substances possess great powers of absorption and are therefore capable of precipitating harmful constituents from gas or air.

The process according to the invention consists in taking the sieve or screen, for instance a metal sieve formed from woven wire and in the first place dipping it into a fluid mass of material having an adhesive action, say for example liquid glass, liquid enamel, a solution of gum or the like and immediately thereafter applying small fragments of charcoal or lime to the sieve. For instance the sieve moistened with adhesive material may be plunged into pulverized charcoal, lime or the like.

When the adhesive material becomes hardened, and this takes place very rapidly where liquid glass is employed, the fragments of charcoal or lime adhere very tightly to the wires forming the mesh of the sieve, so that a porous sieve like body of large superficial area is produced, which is built up from small fragments of charcoal or lime which adhere to the wires of the sieve, and they adhere so tightly that they cannot be loosened by moisture or by the action of many chemical substances and liquids. After the cooling or drying of the sieve thus produced, it may in addition be dipped into suitable solutions which serve for the separation of the precipitates of undesired constituents of exhaust gases for instance of the exhaust gases from internal combustion engines so that the particles of carbon or chalk (that is the filtering materials) become saturated with this solution and then are particularly adaptable for precipitation sieves for the purposes in question.

In particular cases it is not necessary to immerse the device in special solutions, that is when the power of absorption of the particles of charcoal or lime is sufficiently great for the particular substance without it being necessary to conduct an immersion in special solutions.

The process described has the particular advantages that the sieve produced thereby can be used for a long period, that it can be easily changed and saturated with the new solution. A further advantage is that by the help of the invention, filtering plant can be produced, in the case of which the sieves arranged one behind the other are constituted by the foregoing process, but saturated with solutions of chemicals of various kinds so that a liquid, air or gas to be purified passing therethrough has its various impurities separated therefrom in succession.

Supposing for example that it is desired to purify the exhaust gases or exhaust steam of power machines, then sieves produced according to the invention are introduced one behind the other at the exhaust portion or in an extension thereof or in a special chamber. Of these, one portion is soaked in caustic soda or hydroxide of potassium. A further portion is saturated with solutions containing chlorine or the like. The first set of sieves serves for the separation of oil and particles of dirt. The second set serves for the separation of exhaust gases producing a bad smell.

What I claim and desire to secure by Letters Patent of the United States of America is:—

A metal screen having a covering coat of adhesive and a surface coat of particles of absorbent material secured by the adhesive.

In witness whereof I affix my signature.

AUGUST PAHL.